| | Negative Terminal 15 | Positive Terminal 16 | Ground Terminal 17 | Circuit Terminals 18 | Lamp 11 | Lamp 12 | Lamp 13 |
|---|---|---|---|---|---|---|---|
| A | B- | B+ | Grd. | Open | ○ | ○ | ○ |
| B | B+, Grd, Open | B-, Grd., Open | Grd. | Open | ● | ● | ● |
| C | B+, Grd., Open | B+ | Grd. | Open | ○ | ○ | ● |
| D | B- | B-, Grd., Open | Grd. | Open | ● | ● | ○ |
| E | B- | B+ | B+, B-, Open | Open | ● | ● | ○ |
| F | B- | B+ | Grd. | B+, B-, Grd. | ● | ○ | ○ |

○ Lamp Energized
● Lamp Extinguished

INVENTOR
Harold E. Eagle,
BY W.M. Kain
ATTORNEY

| Negative Terminal 15 | Positive Terminal 16 | Positive Terminal 52 | Ground Terminal 17 | Circuit Terminals 18 | Lamp 11 | Lamp 12 | Lamp 81 | Lamp 13 | |
|---|---|---|---|---|---|---|---|---|---|
| B- | B+ | B++ | Grd. | Open | ○ | ○ | ○ | ○ | H |
| B+, B++ Grd | B+ | B++ | Grd. | Open | ● | ○ | ○ | ● | J |
| Open | B+ | B++ | Grd. | Open | ○ | ○ | ○ | ● | K |
| B- | B+ | B+, B- Grd | Grd | Open | ● | ○ | ● | ○ | L |
| B- | B+ | Open | Grd. | Open | ○ | ○ | ● | ○ | M |
| B- | B+ | B++ | B+, B++ B- Open | Open | ● | ● | ● | ○ | N |
| B- | B+ | B++ | Grd. | B++, B+, B-, Grd | ● | ○ | ○ | ○ | O |

○ Lamp Energized
● Lamp Extinguished

United States Patent Office 3,333,188
Patented July 25, 1967

3,333,188
CIRCUIT FOR INDICATING PREDETERMINED VOLTAGE CONDITIONS ON TERMINALS

Harold E. Eagle, Rockaway, N.J., assignor to Western Electric Company, Incorporated, New York, N.Y., a corporation of New York Filed Feb. 17, 1964, Ser. No. 345,527
4 Claims. (Cl. 324—73)

This invention relates to a test circuit for simultaneously checking voltage conditions at a plurality of terminals and more particularly to a test circuit for simultaneously checking voltage conditions at power, ground, and circuit terminals of a receptacle.

Present day electronic systems frequently employ plug-in circuit modules. Such a circuit module often comprises an integrated circuit constructed as a unitary structure. In certain application, for example digital systems equipment, numerous identical circuit modules are stacked in receptacles within equipment cabinets. Usually, each of these receptacles is provided with power terminals which are connected to suitable sources of power, a ground terminal, and a plurality of circuit terminals which are normally open-circulated. The circuit module has power terminals, a ground terminal, and circuit terminals which correspond to and are plugged into the terminals of such a receptacle.

Sometimes an improper voltage is connected to a power, ground, or circuit terminal of a receptacle due to incorrect shop wiring, pinched wires, or other like reasons. Since these circuit modules generally employ expensive components, for example transistors, it is sensible procedure to check for proper voltage conditions at the terminals of a receptacle before inserting a circuit module. Such a procedure eliminates damage to the circuit components by improper voltages applied through any improperly wired receptacle terminals. This invention contemplates a test circuit for simultaneously performing all of the steps of such a procedure.

Checking of the receptacle terminals by present procedures is time consuming since each terminal is individually checked, often manually. Also, the terminals are usually closely spaced, thereby increasing the probability of inaccurate checking of the terminals.

The test circuit of this invention may be conveniently constructed as a test module having terminals identical to those of a plug-in circuit module. Insertion of the test module into a receptacle permits the simultaneous checking of all the receptacle terminals.

Such a test module and procedure has obvious advantages among which are conservation of time and accurate checking of receptacle terminals. Furthermore, improper voltages at the receptacle terminals can be corrected prior to insertion of the circuit module, thereby eliminating damage to circuit components.

An object of this invention is to provide a new and improved test circuit for simultaneously checking voltage conditions at a plurality of terminals.

Another object is to provide a test circuit for simultaneously checking voltage conditions at power, ground, and circuit terminals of a receptacle.

Another object is to provide a test circuit constructed as a test module for simultaneously checking voltage conditions at all the terminals of a receptacle corresponding to the terminals of a plug-in circuit module.

With these and other objects in view, a test circuit illustrating certain features of the invention includes power, ground, and normally-open circuit terminals corresponding, respectively, to the power, ground, and normally-open circuit terminals of a receptacle. Facilities are connected to the power, ground, and circuit terminals for selectively controlling the energization of a plurality of indicators in response to various voltage conditions at the power, ground, and circuit terminals.

More particularly, the test circuit of the invention includes first facilities, for example polarity responsive control diodes, connected to the power terminals and the indicators for controlling the selective energization of the indicators in response to various voltage conditions at the power terminals. Second facilities, for example polarity responsive control diodes, are connected to the normally-open circuit terminals and a switch, for example a transistor, for controlling the conduction of the switch, thereby controlling the selective energization of certain of the indicators in response to various voltage conditions at the normally-open circuit terminals. The energization of the indicators in various combinations is indicative of various voltage conditions at the terminals.

Other objects and advantages of the invention will become apparent by referring to the following detailed specification and accompanying drawings, wherein.

Figures 1, 2, 3:
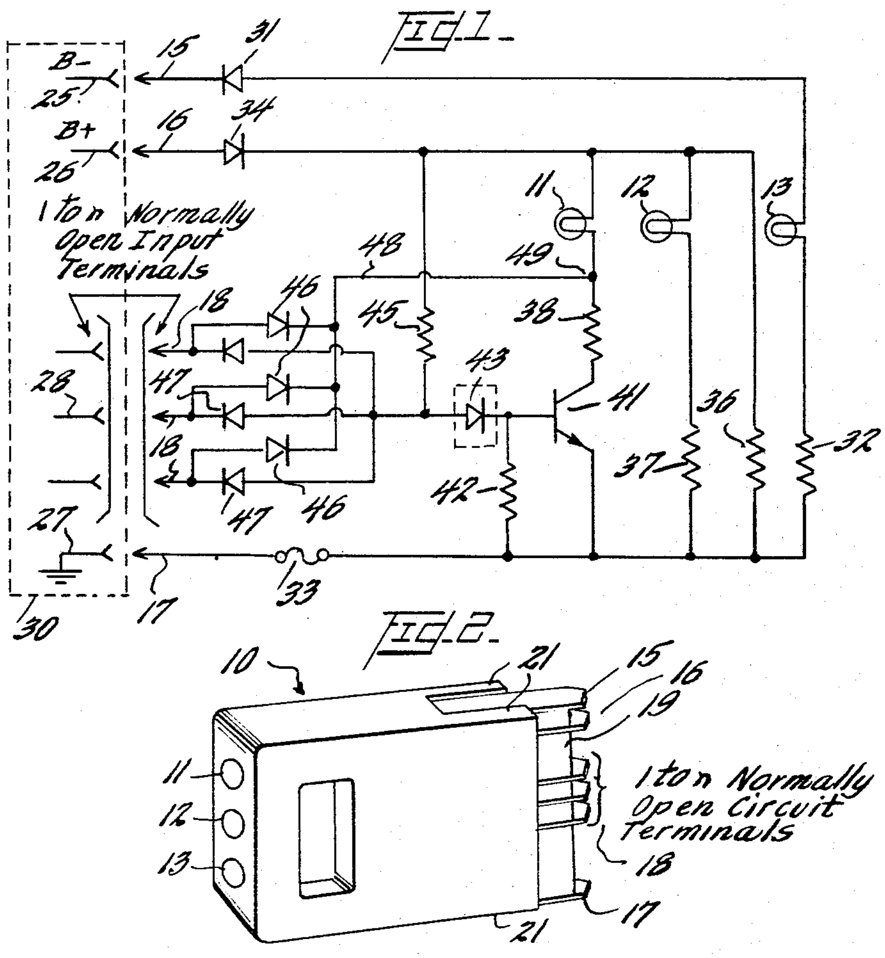
FIG. 1 is an electrical schematic drawing of a first embodiment of a test circuit incorporating certain principles of the invention.
FIG. 2 is a pictorial representation of a plug-in test module on which is constructed the test circuit of FIG. 1, and which includes a plurality of indicator lamps, power, a ground, and a plurality of normally-open circuit terminals.
FIG. 3 is a chart illustrating the combinations of indicator lamps selectively energized in response to various voltage conditions at the terminals of the test circuit of FIG. 1.

In FIG. 2, there is shown a plug-in test module 10 on which is constructed the test circuit of FIG. 1. Indicator lamps 11, 12, and 13, are mounted in the handle portion of test module 10 so as to remain visible when the test module is in use. Although lamps may be the most convenient indicators, it will be apparent to one skilled in the art, that other conventional indicators may be used. A negative power terminal 15, a positive power terminal 16, a ground terminal 17, and 1 to *n* normally-open circuit terminals 18 (hereafter called circuit terminals) are mounted in and extend beyond the end of an insulating block 19. 1 to *n* represents any number of circuit terminals 18 which it may be necessary to employ in testing a particular receptacle. A pair of guide rails 21 are formed on each side of test module 10 to facilitate its insertion into a receptacle 30 (FIG. 1). The terminals of test module 10 are identical to those of a circuit module (not shown) which is to be plugged into a receptacle 30. The test module is also substantially identical in configuration to the circuit module which is to be plugged into receptacle 30.

*First embodiment*

Referring to FIG. 1, receptacle 30 includes a negative power terminal 25, a positive power terminal 26, a ground terminal 27, and *l* to *n* normally-open circuit terminals 28. These terminals correspond, respectively, to negative terminal 15, positive terminal 16, ground terminal 17, and circuit terminals 18 of test module 10 (FIG. 2). Receptacle 30 is shown in outline form and is representative of a plurality of identical, cabinet-mounted receptacles designed to receive physically identical circuit modules (not shown).

Negative terminal 15 is connected through the cathode of a diode 31, lamp 13, a resistor 32, and a fuse 33 to ground terminal 17. Positive terminal 16 is connected through the anode of a diode 34 to lamps 11 and 12, and through a resistor 36 to ground terminal 17. Lamp 12 is connected through a resistor 37 to ground terminal 17. Lamp 11 is connected through a resistor 38 to the collector of an NPN transistor 41 which has its emitter connected to ground terminal 17. A resistor 42 is connected between the base of transistor 41 and ground terminal 17. A conventional level-shift diode 43 has its cathode connected to the base of transistor 41 and its anode connected through a resistor 45 to diode 34. A level-shift diode has the characteristic of a high forward voltage drop with a high reverse resistance. Level-shift diode 43 may be replaced by several standard diodes connected in series to attain the necessary forward voltage drop of a single level-shift diode.

Each circuit terminal 18 is connected in parallel to the anode of a first diode 46 and the cathode of a second diode 47. The anodes of all diodes 47 are connected in parallel to the anode of level-shift diode 43. The cathodes of all diodes 46 are connected in parallel over a lead 48 to a junction 49 of lamp 11 and resistor 38.

Since space is a consideration in constructing test module 10, diodes 31, 34, 46, and 47, and level-shift diode 43 may most conveniently be semiconductor devices. It is to be understood, however, that these diodes may be any of a variety of polarity sensitive devices, for example, gas diodes or the like, in a particular application of the invention.

*Operation*

If receptacle 30 is properly wired, negative terminal 25 is connected to a negative DC voltage source, positive terminal 26 is connected to a positive DC voltage source, ground terminal 27 is connected to ground potential, and each circuit terminal 28 is open-circuited.

An understanding of the operation of the test circuit of FIG. 1 is facilitated by referring to FIG. 3. FIG. 3 illustrates the various voltage conditions which may be applied to the terminals of test module 10 through the corresponding terminals of receptacle 30, and the selected energization of lamps 11, 12, and 13 in response to these voltage conditions. Reference character B+ represents the positive DC voltage source, B− represents the negative DC and voltage source, GRD represents ground potential, and OPEN represents an open-circuit condition. These reference characters will be used throughout the remainder of the specification.

Assume that the proper voltage conditions are connected to the terminals of the receptacle. In this situation, lamps 11, 12, and 13 are energized (FIG. 3, line A).

B− applied to negative terminal 15 renders diode 31 conductive, thereby completing a circuit through resistor 32 to ground terminal 17 to energize lamp 13. B+ applied to positive terminal 16 renders diode 34 conductive, thereby completing a circuit through resistor 37 to ground terminal 17 to energize lamp 12. Transistor 41 is rendered conductive by positive voltage applied to its collector through resistor 38 and to its base through resistor 45 and level-shift diode 43. This action completes a circuit through conductive transistor 41 to ground terminal 17 to energize lamp 11.

Next assume that B+, GRD, or OPEN is connected to negative terminal 25, and that B−, GRD, or OPEN is connected to positive terminal 26. In this situation, lamps 11, 12, and 13, are extinguished (FIG. 3, line B).

B+, GRD, or OPEN applied to negative terminal 15 renders diode 31 non-conductive. B−, GRD, or OPEN applied to positive terminal 16 renders diode 34 non-conductive. Thus, non-conductive diodes 31 and 34 preclude the completion of a circuit for any of the lamps. If improper voltage conditions are applied only to negative terminal 15, then only lamp 13 is extinguished (FIG. 3, line C). If improper voltage conditions are connected only to positive terminal 16, then only lamps 11 and 12 are extinguished (FIG. 3, line D).

Next, assume that B+, B−, or OPEN is connected to ground terminal 27. In any of these situations, lamps 11 and 12 are extinguished and lamp 13 is energized (FIG. 3, line E). B+ at ground terminal 17 is applied to the emitter of transistor 41 to prevent its conduction. Thus, lamp 11 is extinguished. B+ is applied to one side of lamp 12 through diode 34 and to the other side through ground terminal 17. This results in insufficient potential difference across lamp 12 to energize it.

If OPEN is applied to ground terminal 17, positive voltage is established at the emitter of transistor 41 because the resistance of resistor 36 is sufficiently less than the combined resistance of lamp 12 and resistor 37. This prevents the conduction of the transistor and maintains lamp 11 extinguished. Positive voltage is also applied to both sides of lamp 12. This results in an insufficient potential difference across lamp 12 to energize it. A circuit is established from positive terminal 16, through diode 34, resistors 36 and 32, lamp 13, and diode 31 to negative terminal 15, thereby energizing lamp 13.

If B− is applied to ground terminal 17, B− and B+ (at positive terminal 16) are applied across resistor 36. Ordinarily, resistor 36 would have to be relatively large to dissipate the full power developed by these two voltages across the resistor. Low wattage fuse 33 is provided in series with resistor 36 and will blow under these conditions. When fuse 33 blows, an OPEN is present at ground terminal 17. Lamps 11 and 12 are extinguished.

Next, assume that B+, B−, or GRD is connected to any circuit terminal 28. In any of these situations, lamp 11 is extinguished and lamps 12 and 13 are energized (FIG. 3, line F). B+ at any circuit terminal 18 is applied to the anode of its associated diode 46. Diode 46 is rendered conductive to apply B+ to junction point 49. Since B+ already is applied through diode 34 to lamp 11, insufficient potential difference exists across the lamp to energize it.

B− or GRD at any circuit terminal 18 is applied to the cathode of its associated diode 47, thereby rendering the diode conductive. This establishes a shunt path to divert the base drive for transistor 41. This action renders transistor 41 non-conductive and lamp 11 is extinguished.

It will be apparent that transistor 41 behaves as a switch, the conduction of which is controlled by the various voltage conditions applied at the circuit terminals. In turn, transistor 41 controls the conduction of lamp 11. Furthermore, lamp 11 will extinguish when any voltage between B− and B+ is applied to any circuit terminal. Also, lamp 11 will extinguish if B− is applied to one circuit terminal 18 and B+ to another.

*Second embodiment*

The basic circuit of FIG. 1 can be modified to check for proper voltage conditions at a receptacle 30 having more than two power terminals 25 and 26. In the test circuit shown in FIG. 4, a second positive terminal 52 is provided in addition to the first positive terminal 16 and negative terminal 15. Second positive terminal 52 corresponds to a receptacle terminal (not shown) which is connected to a second positive DC voltage source.

Figures 4, 5:
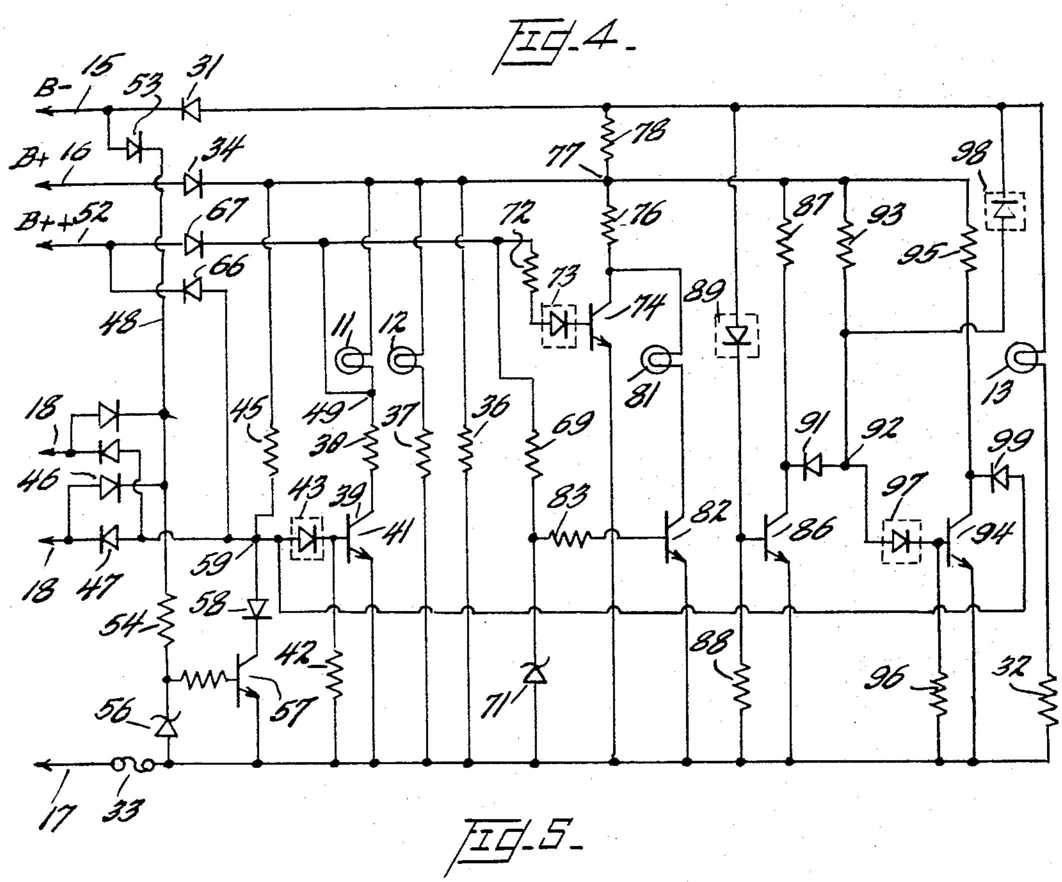
FIG. 4 is an electrical schematic drawing of a second embodiment of the test circuit of the invention.
FIG. 5 is a chart illustrating the combinations of indicator lamps selectively energized in response to various voltage conditions at the terminals of the test circuit of FIG. 4.

The circuit of FIG. 4 includes a circuit identical to that of FIG. 2 except that the cathodes of diodes 46 are not connected over lead line 48 to junction 49. In the circuit of FIG. 4, the cathodes of diodes 46 are connected through the cathode of a diode 53 to negative terminal 15, and through a resistor 54 and the cathode of a Zener diode 56 to ground terminal 17. Also, the circuit of FIG. 4 includes an NPN transistor 57 having its collector connected through the cathode of a diode 58 to a junction 59 of resistor 45 and level-shift diode 43, its emitter connected to ground terminal 17, and its base connected through a resistor to the junction of resistor 54 and diode 56.

Second positive terminal 52 is connected through the cathode of a diode 66 to junction 59, through the anode of another diode 67 to junction 49, through a resistor 69 and the cathode of a Zener diode 71 to ground terminal 17, and through a resistor 72 and a level-shift diode 73 to the base of an NPN transistor 74.

Transistor 74 has its emitter connected to ground terminal 17 and its collector connected through a resistor 76 to a junction 77. Junction 77 is connected to the cathode of diode 34 and through a resistor 78 to the anode of diode 31. The collector of transistor 74 is also connected through an indicator lamp 81 to the collector of an NPN transistor 82. Transistor 82 has its emitter connected to ground terminal 17 and its base connected through a resistor 83 to the junction of resistor 69 and Zener diode 71.

An NPN transistor 86 has its emitter connected to ground terminal 17, its collector connected through a resistor 87 to junction 77, and its base connected through a resistor 88 to ground terminal 17 and through a level-shift diode 89 to diode 31. The collector of transistor 86 is also connected through the cathode of a diode 91 to a junction 92 and then through a resistor 93 to junction 77.

An NPN transistor 94 has its emitter connected to ground terminal 17, its base connected through a resistor 96 to ground terminal 17 and through a level-shift diode 97 to junction 92, and its collector connected through a resistor 95 to junction 77 and through the cathode of a diode 99 to junction 59. Junction 92 is also connected through a level-shift diode 98 to diode 31.

*Operation*

The operation of the test circuit of FIG. 4 is facilitated by referring to FIG. 5. FIG. 5 illustrates the various voltage conditions which may be applied to the terminals of a test module incorporating the circuit of FIG. 4 through the corresponding terminals of a receptacle (not shown) and the selective energization of lamps 11, 12, 13, and 81 in response to these voltage conditions.

Assume that the first positive voltage (hereafter identified by reference character B+) normally applied to first positive terminal 16 is greater than the magnitude of the second positive voltage (hereafter identified by reference character B++) normally applied to second positive terminal 52. Assume also that B+ applied to first positive terminal 16 is always present.

Next, assume that the test module is inserted into a receptacle 30 and that the correct voltage conditions are connected to the terminals of the receptacle. In this situation, the proper voltages are applied to the corresponding test module terminals to energize lamps 11, 12, 13, and 81 (FIG. 5, line H).

B− applied to negative terminal 15 renders diode 31 conductive, thereby completing a circuit through resistor 32 to ground terminal 17 to energize lamp 13. B+ applied to positive terminal 16 renders diode 34 conductive, thereby completing a circuit through resistor 37 to ground terminal 17 to energize lamp 12. Transistor 41 is rendered conductive by positive voltage applied to its collector through resistor 38 and to its base through resistor 45 and level-shift diode 43. This action completes a circuit through conductive transistor 41 to ground terminal 17 to energize lamp 11.

B++ is applied through second positive terminal 52 and diode 67 is insufficient to render diode 73 conductive. Therefore, transistor 74 is rendered non-conductive. However, positive voltage is applied through diode 67, resistors 69 and 83, to render transistor 82 conductive. This completes a circuit through diode 34, resistor 76, and now conductive transistor 82 to ground terminal 17 to energize lamp 81.

Next, assume that the B+, B++, or GRD is applied to negative terminal 15 from the corresponding receptacle terminals. In this situation, lamps 11 and 13 are extinguished and lamps 12 and 81 are energized (FIG. 5, line J). Either B+ or B++, or any voltage between B+ and B++, applied to negative terminal 15 renders diode 31 nonconductive. This precludes the completion of a circuit for lamp 13. B+ or B++, or any voltage between B+ and B++, applied at negative terminal 15 renders diode 53 conductive, thereby applying positive voltage through resistor 54 to render transistor 57 conductive. This provides a shunt path to divert the base drive for transistor 41. Thus, transistor 41 is non-conductive and lamp 11 is extinguished.

When the correct voltage conditions are connected to the terminals of the test module, negative voltage is applied through diode 31 and level-shift diode 98 to junction 92. This renders diode 91 and level-shift 97 nonconductive, thereby rendering transistor 94 non-conductive. Negative voltage is also applied through diode 31 to render level-shift diode 89 non-conductive and thereby render transistor 86 non-conductive. However, GRD at negative terminal 15 establishes a shunt path from diode 34, through resistor 78, to diode 31, to establish a voltage at the junction of resistor 78 and diode 31 insufficient to energize lamp 13. The shunt path also diverts the base drive for transistor 86. Transistor 86 is thereby rendered non-conductive and does not establish a shunt path for the base drive of transistor 94 from B+ at first positive terminal 16. In this manner, the base drive for transistor 41 is diverted through diode 99 and conductive transistor 94 to ground terminal 17. Thus, transistor 41 is rendered non-conductive and lamp 11 is extinguished.

Next, assume that OPEN is applied to negative terminal 15. In this situation, lamp 13 is extinguished and lamps 11, 12, and 81 are energized (FIG. 5, line K). OPEN at negative terminal 15 renders diode 31 non-conductive, thereby precluding the completion of a circuit for lamp 13.

Next, assume that the B+, B−, or GRD is applied to second positive terminal 52. In this situation, lamps 11 and 81 are extinguished and lamps 12 and 13 are energized (FIG. 5, line L). B+ is applied to one side of lamp 11 through diode 34 and to the other side at junction 49 through diode 67. Lamp 11 is extinguished since there is no potential difference across the lamp. B+ applied through diode 67 is sufficient to render diode 73 and transistor 74 conductive. This establishes a shunt path through conductive transistor 74 to divert the current flowing through resistor 76 to ground terminal 17. Thus, no current flows to lamp 81 to energize it.

When B− or GRD, or any voltage between B− and GRD, is applied to second positive terminal 52, diode 66 is rendered conductive to establish a shunt path for the base drive of transistor 41. Transistor 41 is rendered non-conductive and lamp 11 is extinguished. Also, since no positive voltage is present at second position terminal 52, transistors 74 and 82 are rendered non-conductive to preclude the completion of a circuit for lamp 81.

Next, assume that OPEN is applied to second positive terminal 52. In this situation, lamp 81 is extinguished and lamps 11, 12, and 13 are energized (FIG. 5, line M). OPEN applied at second positive terminal 52 renders diode 67 non-conductive. Thus, transistors 74 and 82 are rendered non-conductive to preclude the completion of a circuit for lamp 81.

Next, assume that the B+, B++, B−, or OPEN is applied to ground terminal 17. In this situation, lamps 11, 12, and 81 are extinguished and lamp 13 is energized (FIG. 5, line N). Either B+ or B++ applied to the emitter of transistors 41 and 82, renders these transistors non-conductive. Thus, lamps 11 and 81 are extinguished. B+ is applied to one side of lamp 12 through diode 34 and B+ or B++ to the other side through ground terminal 17. Lamp 12 is extinguished since insufficient potential difference exists across the lamp to energize it.

B− applied to ground terminal 17 combines with the B+ at terminal 16 to develop sufficiently large power through resistor 36 to blow fuse 33. This results in an open-circuit condition at ground terminal 17. Lamps 11 and 81 are extinguished since transistors 41 and 82 are non-conductive and lamp 12 is extinguished since insufficient potential difference exists across the lamp to energize it.

Finally, assume that the B+, B++, B−, or GRD is connected to circuit terminals 18 (FIG. 5, line O). Either B+ or B++, or any voltage between B+ and B++, connected to any circuit terminal 18 renders the associated diode 46 conductive. This applies positive voltage through resistor 54 to the base of transistor 57. Transistor 57 is rendered conductive to establish a shunt path to divert the base drive for transistor 41. Transistor 41 is rendered non-conductive and lamp 11 is extinguished. Either B− or GRD, or any voltage between B− and GRD, connected to any terminal 18 renders the associated diode 47 conductive. This establishes a shunt path to divert the base drive for transistor 41. Transistor 41 is maintained non-conductive and lamp 11 is extinguished.

Although the test circuit of this invention has been described with respect to a test circuit for checking power and normally-open circuit terminals of a receptacle in digital systems equipment, it will be apparent to one skilled in the art that the test circuit is of general utility and can be modified to simultaneously check a plurality of terminals in a wide variety of situations. It will further be apparent to one skilled in the art that the NPN transistors can readily be replaced by PNP transistors with the proper biasing arrangements.

It is to be understood that the above-described embodiments are illustrative of the principles of the invention and that the test circuit can be modified to check any practicable number of power and circuit terminals without departing from the scope of the invention.

What is claimed is:

1. In apparatus for testing a receptacle, a test circuit constructed as a module and having terminals corresponding to the terminals of the receptacle for simultaneously checking the voltage conditions at the terminals of the receptacle, comprising negative and positive terminals arranged for connection to negative and positive power terminals of the receptacle, a plurality of circuit terminals arranged for connection to a plurality of normally-open circuit terminals of the receptacle, a ground terminal arranged for connection to a ground potential terminal of the receptacle, a first indicator lamp connected to the negative terminal and the ground terminal, second and third indicator lamps connected to the positive terminal and the ground terminal, the third indicator lamp also being connected to the circuit terminals, a first diode connected in series with the negative terminal and the first indicator lamp, a second diode connected in series with the positive terminal and the second and third indicator lamps, the first and second diodes controlling the energization of the indicator lamps in response to various voltage conditions at the negative and positive terminals, a diode network connecting each circuit terminal to the third indicator lamp, and a transistor having an emitter and a collector connected in series with the third indicator lamp, the positive terminal, and the ground terminal, and having a base connected to the diode network, the conduction of the transistor being controlled to energize the third indicator lamp in response to any voltage condition applied to the circuit terminals other than the open-circuit condition.

2. In apparatus for testing of a receptacle, a test circuit constructed as a module and having terminals corresponding to the terminals of the receptacle for simultaneously checking the voltage condition at the terminals of the receptacle, comprising first and second positive terminals arranged for connection to first and second positive power terminals of the receptacle, a negative terminal arranged for connection to the negative power terminal of the receptacle, a plurality of circuit terminals arranged for connection to a plurality of normally-open circuit terminals of the receptacle, a ground terminal arranged for connection to a ground potential terminal of the receptacle, a first indicator lamp connected to the negative terminal and the ground terminal, second and third indicator lamps connected to the first positive terminal and the ground terminal, a fourth indicator lamp connected to the first positive terminal and the ground terminal, a first diode connected in series with the negative terminal and the first indicator lamp, a second diode connected in series with the first positive terminal and the second and third indicator lamps, a first transistor having its collector and emitter connected in series with the third indicator lamp, a third diode connected between the second positive terminal and the base of the first transistor, a second transistor having its collector and emitter connected in parallel with the base and emitter of the first transistor, a diode network connecting each of the circuit terminals to the bases of the first and second transistors, the third diode and the diode network controlling the energization of the third indicator lamp, a third transistor having its collector and emitter connected in series with the fourth indicator lamp and the first positive terminal, and a fourth diode connecting the second positive terminal to the base of the third transistor for controlling the energization of the fourth indicator lamp.

3. A circuit for testing a voltage on a terminal between first and second predetermined voltages comprising:

a series circuit which includes a current responsive device and an emitter and a collector of a first transistor;

a second transistor having an emitter and a collector connected in parallel with the current responsive device and the first transistor;

means for connecting the series circuit across a voltage source;

a first diode which is conductive for voltages above the first predetermined voltage and is non-conductive for voltages below the first predetermined voltage;

means for connecting the first diode between the terminal and the base of the first transistor so that the first transistor is rendered conductive when the voltage on the terminal exceeds the first predetermined voltage;

a second diode which is conductive for voltages above the second predetermined voltage and is non-conductive for voltages below the second predetermined voltage; and means for connecting the second diode between the terminal and the base of the second transistor so that the second transistor is rendered conductive to shunt the first transistor and the current responsive device when the voltage on the terminal exceeds the second predetermined voltage.

4. A circuit for testing a voltage on a power terminal, an open circuit condition on a circuit terminal, and a ground potential on a ground terminal comprising:

a first series circuit including a first current responsive device and a first diode;

a second series circuit including a collector and emitter of a first transistor and a second current responsive device;

means for biasing the first transistor conductive;

a second transistor having its collector and emitter connected in parallel with the base and emitter of the first transistor;

means for biasing the second transistor non-conductive;

a second diode connected to the base of the first transistor such that voltages of a first polarity on the second diode render the first transistor non-conductive;

a third diode connected to the base of the second transistor such that voltages of a second polarity on the third diode render the third diode conductive; and means for connecting the first and second series circuits across the power terminal and the ground terminal and for connecting the second and third diodes between the circuit terminal and the bases of the respective first and second transistors.

References Cited

UNITED STATES PATENTS

| | | | |
|---|---|---|---|
| 2,902,642 | 9/1959 | Voegtlen | 324—28 X |
| 3,217,310 | 11/1965 | Pearson | 340—248 |

RUDOLPH V. ROLINEC, *Primary Examiner.*

WALTER L. CARLSON, *Examiner.*

E. L. STOLARUN, *Assistant Examiner.*